United States Patent [19]
Tsuchitani et al.

[11] Patent Number: 5,350,189
[45] Date of Patent: Sep. 27, 1994

[54] CAPACITANCE TYPE ACCELEROMETER FOR AIR BAG SYSTEM

[75] Inventors: Shigeki Tsuchitani, Mito; Seiko Suzuki, Hitachioota; Masayuki Miki, Katsuta; Masahiro Matsumoto, Hitachi, all of Japan

[73] Assignee: Hitachi, Ltd., Tokyo, Japan

[21] Appl. No.: 918,021

[22] Filed: Jul. 24, 1992

[30] Foreign Application Priority Data

Jul. 24, 1991 [JP] Japan ................. 3-184595

[51] Int. Cl.$^5$ ......................... H01L 21/302
[52] U.S. Cl. ........................... 280/728 R
[58] Field of Search ............. 73/517 R, 517 A; 280/735, 728, 734

[56] References Cited

U.S. PATENT DOCUMENTS 5,006,487  4/1991  Stokes ..................... 73/517 R
5,008,774  4/1991  Bullis et al. ............. 73/517 R
5,067,745  11/1991  Yoshikawa ................ 280/735

Primary Examiner—Edwin L. Swinehart
Attorney, Agent, or Firm—Antonelli, Terry, Stout & Kraus

[57] ABSTRACT

In a capacitance type accelerometer used for an air bag system etc., a plurality of grooves crossing each other are provided on the surface of a movable electrode which is arranged to face a fixed electrode at a portion having a gap therebetween, and end portions of each groove open to an outside space at the portion between the movable electrode and the fixed electrode. The grooves can be provided on surface of the fixed electrodes. Ventilation between inside and outside of the facing portion is improved by opening of the grooves to outside space, and air damping which is caused at operation of the movable electrode at the gap between the electrodes is reduced, and, consequently, response speed of the movable electrode is increased.

11 Claims, 10 Drawing Sheets

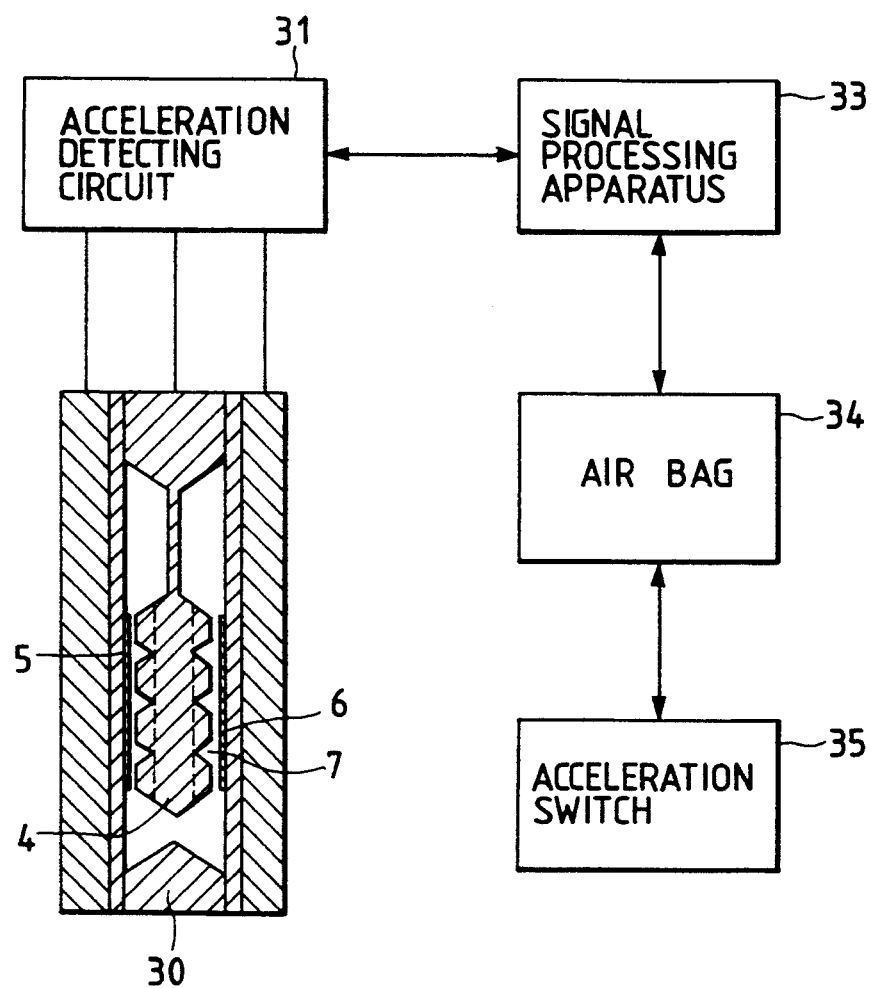

CAPACITANCE TYPE ACCELEROMETER FOR AIR BAG SYSTEM

BACKGROUND OF THE INVENTION (1) Field of the Invention

The present invention relates to a capacitance type accelerometer and an air bag system utilizing the same.

(2) Description of the Prior Art

A capacitance type accelerometer is fundamentally composed of a movable electrode (mass portion) supported by an elastic supporting member (for instance, a cantilever, a diaphragm, etc.), and a fixed electrode facing the movable electrode with a small gap thereinbetween. When an inertial force caused by acceleration is applied to the movable electrode, the movable electrode is displaced to a position where the inertial force balances with restitution force of the elastic supporting member (an elastic body), a value of capacitance between the movable electrode and the fixed electrode is changed according to the acceleration, and the acceleration can be determined from the value of the capacitance.

The above described kind of accelerometer is noteworthy as capable of being miniaturized and having high precision.

A capacitance type accelerometer in the prior art is disclosed, for example, in JP-A-60-244864 (1985).

In considering dynamic operation of a capacitance type accelerometer, when a movable electrode is displaced in a direction thereby reducing the gap between the movable electrode and fixed electrode, viscous gas existing in the narrow gap between the electrodes is pushed out from the gap, and a large resisting force in a direction opposite to the displacing direction is caused on the movable electrode by the squeeze film effect of viscous gas. On the other hand, when the movable electrode is displaced in a direction to thereby widen the gap therein between, a large resisting force in a direction to hinder the dislocation is caused by XYZ. The above described resisting forces are so-called air damping, and result in a lower response of the sensor.

SUMMARY OF THE INVENTION (1) Object of the Invention

The present invention is achieved in consideration of the above described aspect, and object of the present invention is to solve the above described problems and to realize a quicker response of capacitance type accelerometers.

(2) Methods for Solving the Problems of the Prior Art

The above described object is realized by providing grooves for reducing constant air damping on electrode surface of at least one of a movable electrode and a fixed electrode comprising the above described capacitance type accelerometer.

As for a state of the groove for reducing air damping constant, the groove on the electrode surface which has substantial air-ventilation both inside and outside of the gap between the facing movable electrode and fixed electrode is provided; and, as a concrete example, a structure in which each of the end portions of the groove on the electrode surface is open to any of the electrode sides and the open front portions on the external surface of the portion facing the above described electrodes is provided.

In the most preferred embodiment of the above described groove for reducing air damping constant, the grooves are arranged so that the electrode areas divided by the grooves become symmetrical, the grooves are arranged so that the electrode divided into a plurality of areas by the grooves become uniformly balanced are proposed.

Further, as for application systems, an air bag system having means to detect acceleration in a car crash as a change in capacitance between a movable electrode of which surface is divided into a plurality of areas by grooves for reducing the air damping constant and a facing fixed electrode are provided, and to operate an air bag in accordance with the change of the capacitance is proposed.

A reduction of the air damping constant is realized by considering the structure of the grooves which are provided on at least one of the movable electrode and the fixed electrode. For example, ventilation in the groove is certainly maintained by facing each end portion of the groove on the electrode surface to any end portion of the electrode side. Consequently, the movable electrode is displaced according to the acceleration, and, when the displacement is in a direction to thereby decrease the gap thereinbetween, the gas in the electrodes facing portion (the gap between the electrodes) flows into the groove, and thereby through the groove and thus, the gas is smoothly released to outside of the electrodes facing portion with less ventilation resistance.

On the other hand, when the displacement is in a direction to thereby increase the gap, the gas outside the electrode facing portion flows locally through the groove having small ventilation resistance and moves quickly into the gap of the electrodes. In accordance with the above described operation, the resistance on the electrode surface caused by the gas moving in and out of the electrodes facing portion when the movable electrode is displaced can be reduced, the function to decrease air damping constant is realized, and response of the movable electrode to acceleration can be improved.

Further, when the above described grooves for reducing the air damping constant are arranged so that the electrode areas divided by the grooves become symmetrical on the right side and left side, especially when the movable electrode is supported by a cantilever, the right side and the left side of the electrode areas are balanced, and further, reactions caused by the flowing of gas to outside of the electrodes facing portion through the grooves can be mutually canceled, onesided movement of the movable electrode is prevented, and not only stability of the operation but also reliable repetition can be sufficiently guaranteed.

When the above described grooves for reducing the air damping constant are arranged so that the electrode areas divided by the grooves become uniformly balanced, even though the movable electrode is elastically supported by cantilevers and diaphragm etc. from a plurality of directions, stable operation of the movable electrode and also reliable repetition can be sufficiently guaranteed as same as the above described example.

Accordingly, when the accelerometer relating to the present invention is applied to such a system requiring quick response such as a car air bag system, performance of the system operation can be improved. Specifically, although the air bag system requires response in at least 500-1 KHz, such requirement for response can be satisfied in accordance with the present invention.

BRIEF DESCRIPTION OF THE DRAWINGS

FIG. 17 is a diagram representing a composition of an air bag system which is an applied system of the present invention.

DETAILED DESCRIPTION OF THE EMBODIMENTS

The embodiments of the present invention are explained referring to related drawings.

EMBODIMENT 1

Figure 1A:
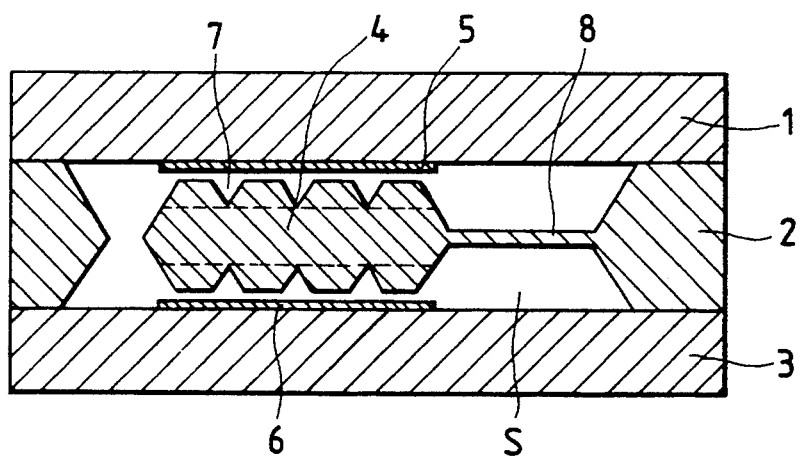
FIGS. 1 (a) and (b) are respectively a vertical cross section of the capacitance type accelerometer relating to the first embodiment of the present invention and a plan view of the movable electrode thereof.
Figure 1B:
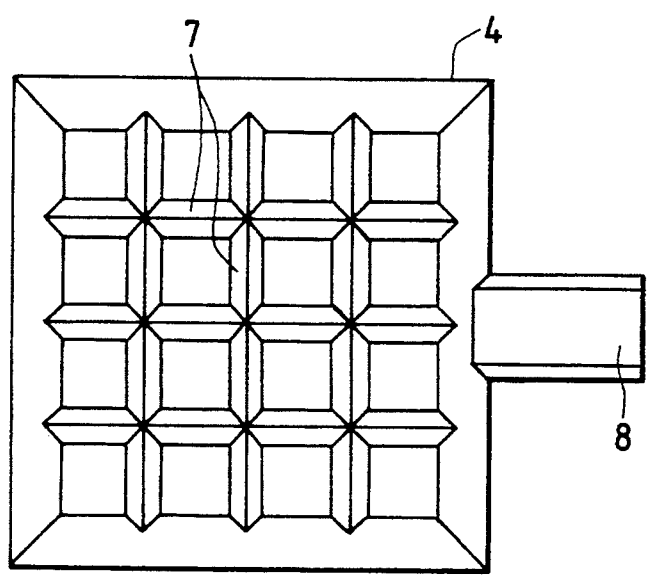

FIGS. 1 (a) and (b) are respectively a vertical cross section of the capacitance type accelerometer relating to the first embodiment of the present invention and a plan view of the movable electrode also relating to the first embodiment of the present invention.

Referring to FIG. 1 (a), the accelerometer relating to the present embodiment has an integrated structure composed of three substrates such as the insulating substrate 1, the silicon substrate 2, and another insulating substrate 3. Regarding the insulating substrates 1 and 3, for example, pylex glass is used, the fixed electrodes 5 and 6 composed of metallic thin films are formed on the internal plane of the pylex glass using a spatter method, and the insulating substrates 1 and 3 are connected to the silicon substrate 2 by anodic bonding.

The flat plate type movable electrode 4 (mass portion) and at least one cantilever 8 for supporting the movable electrode 4 are formed in the silicon substrate 2 by anisotropic etching using an alkaline solution. The movable electrode 4 is arranged to face the fixed electrodes 5 and 6 with a small gap, for example, from one to five micrometers thereinbetween. Further, in the present embodiment, both sides of the movable electrode 4 comprise electrode surfaces so as to be able to detect acceleration of vertical direction for the plane surface of the movable electrode. The grooves 7 for reducing air damping constant are notched on the both sides of the movable electrode 4 by etching.

The groove structure 7 in the present embodiment comprises a plurality of grooves crossing each other at right angles in a grid like pattern, with both ends of every groove open onto four sides (side walls) of the movable electrode 4. The groove structure 7 is connected to the space S outside the facing portion between the movable electrode 4 and the fixed electrode 5, and the movable electrode 4 and the fixed electrode 6 through the above described openings.

When an acceleration G effects the above described capacitance type accelerometer, the movable electrode 4 displaces toward the direction opposite the acceleration by inertia in response to the acceleration, the gap between the movable electrode and the fixed electrode is changed, and, consequently, the capacitance is changed. The degree of the acceleration can be determined by measuring the change of the capacitance as electric signals.

Further, ventilation between the inside and outside of the movable electrode 4 and the fixed electrodes 5 and 6 can be enhanced by improving the connection interconnection of the grooves comprising groove structure 7, and opening the ends of the groove structure 7 to the space S, outside the portion adjacent to the fixed electrodes, or facing portion. Consequently, when the movable electrode 4 is displaced, the gas in the facing gap releases through the grooves at the side where volume of the facing gap is decreased according to the displacement of the movable electrode in relation to the fixed electrodes 5 and 6, and the gas smoothly flows out to the outside space S through the plurality of the grooves. On other hand, at the side where volume of the facing gap is increased according to the displacement of the movable electrode in the opposite direction, the gas in the outside space S smoothly flows into the facing gap through the plurality of grooves which are provided on the movable electrode surface of the increasing facing gap side. As the result, the air damping constant which is caused in the direction opposite the displacement of the movable electrode is small, and therefore response speed of the accelerometer as a sensor can be enhanced.

Further, the groove structure 7 in the present embodiment is so arranged as to divide the area of the movable electrode 4 surface equally and symmetrically to all four sides. Accordingly, mass of the movable electrode 4 is uniformly distributed to the center of the gravity and the reaction force of the gases released from the opening of the grooves facing the outside of the portion adjacent the fixed electrodes cancel each other, and, therefore, stable and balanced displacement of the movable electrode is guaranteed and reliable repetition, which is indispensable for an instrument, is maintained.

EMBODIMENTS 2-4

Figure 2:
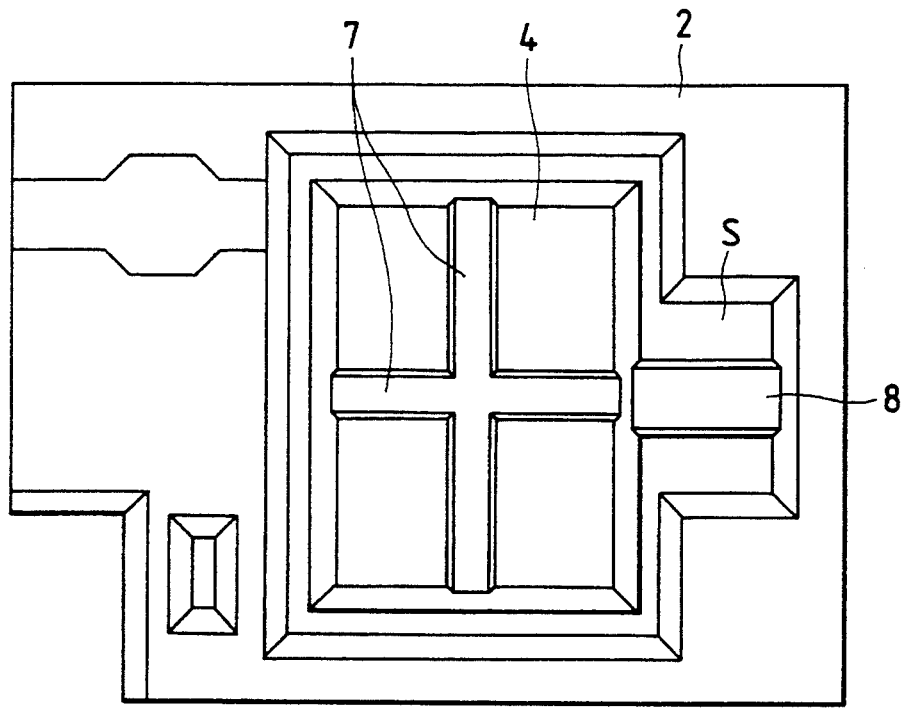
FIG. 2 is a plan view of the movable electrode existing inside the capacitance type accelerometer relating to the second embodiment of the present invention.
Figure 3:
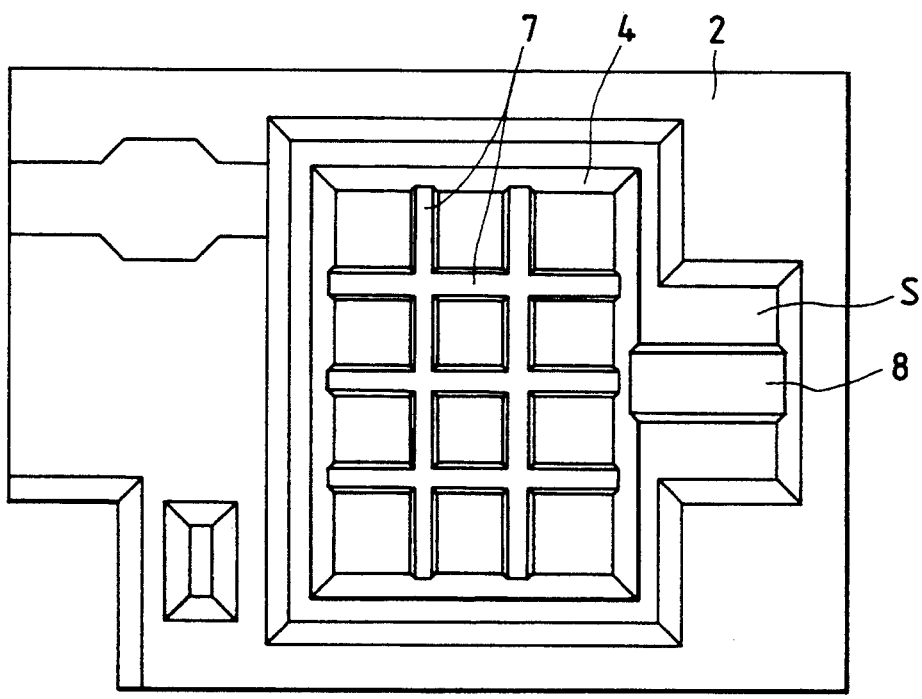
FIG. 3 is a plan view of the movable electrode existing inside the capacitance type accelerometer relating to the third embodiment of the present invention.
Figure 4:
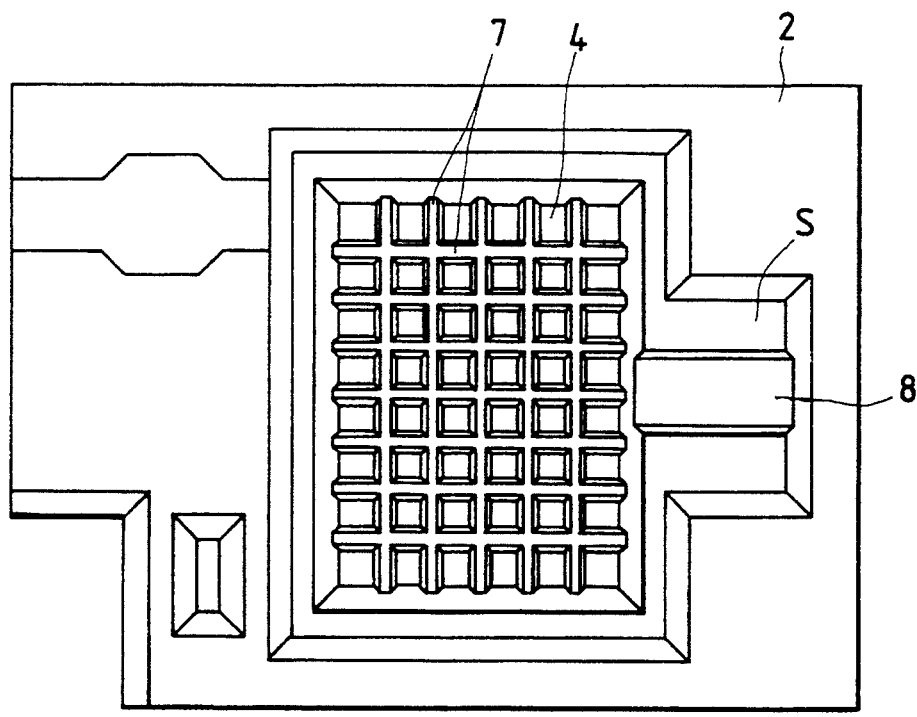
FIG. 4 is a plan view of the movable electrode existing inside the capacitance type accelerometer relating to the fourth embodiment of the present invention.

FIGS. 2-4 comprise other examples (taken as the embodiments 2-4) in which the surface of the movable electrode 4 is divided to a plurality of areas by a plurality of grooves crossing each other at right angles as in as FIG. 1.

According to the present embodiments, response speed to acceleration of the sensor was actually determined according to the changing dimensions and arrangement of the groove structure 7.

Figure 5:
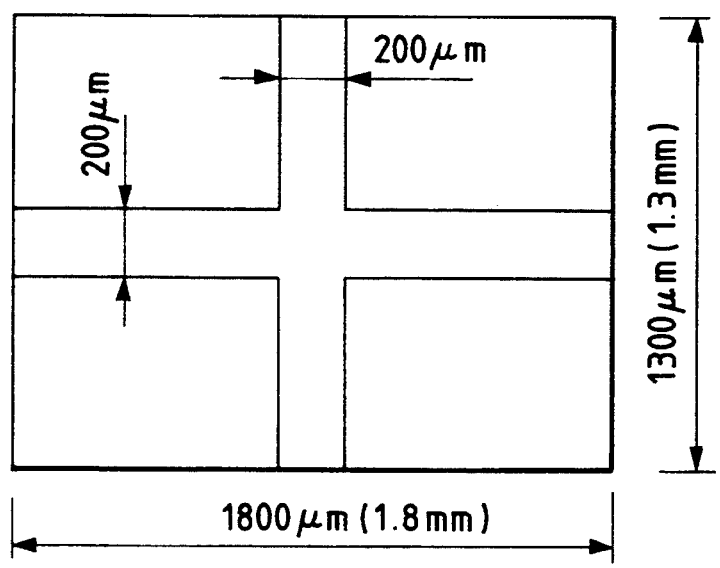
FIG. 5 is a drawing indicating an example of concrete specification of the movable electrode in FIG. 2.
Figure 6:
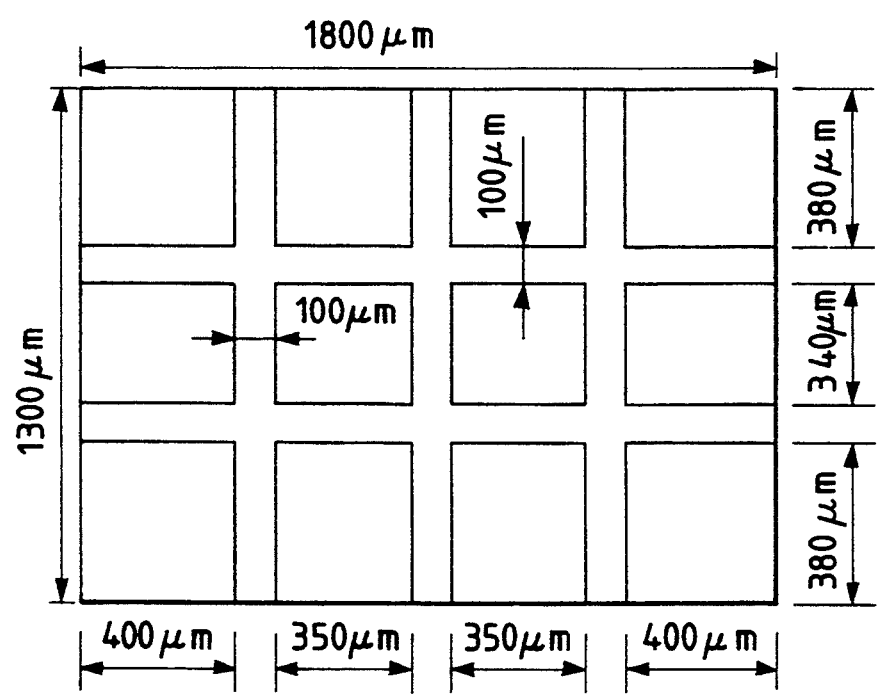
FIG. 6 is a drawing indicating an example of concrete specification of the movable electrode in FIG. 3.
Figure 7:
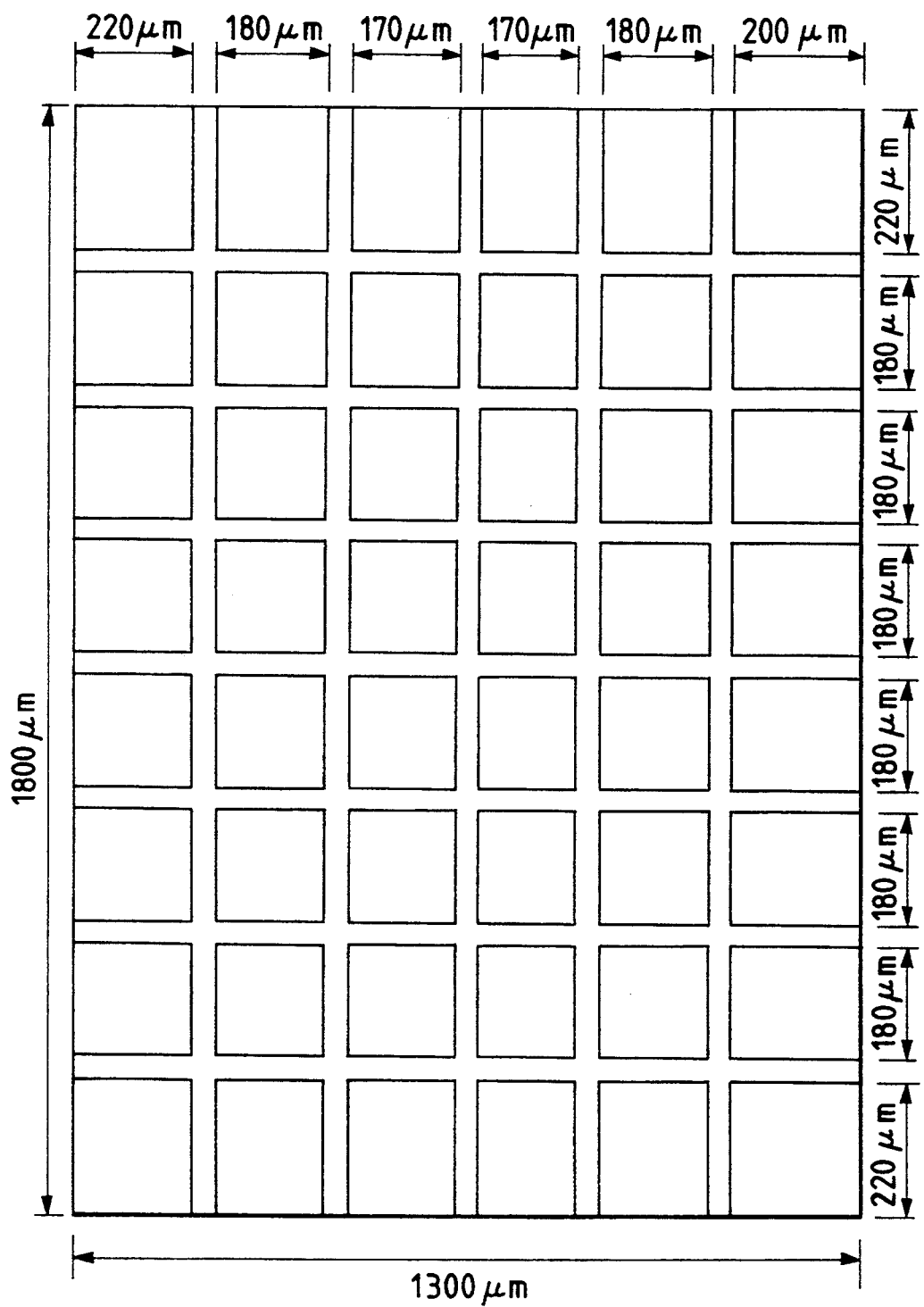
FIG. 7 is a drawing indicating an example of concrete specification of the movable electrode in FIG. 4.

An example of concrete specifications of the grooves shown in FIGS. 2-4 is illustrated in FIGS. 5-7.

First, in accordance with the second embodiment illustrated in FIG. 2, the grooves comprising groove structure 7 crossing each other at a right angle on surface of the movable electrode 4 are so formed as to divide the electrode surface into four areas. Dimensions of the movable electrode in the present embodiment are 1.3 mm in length, 1.8 mm in width, 200 $\mu$m in groove width, and 30 $\mu$m in groove depth as illustrated in FIG. 5. The ratio of the groove structure 7 to the movable electrode 4 (area of the grooves/surface area of the electrode) in the present embodiment is 25%. When a sensor having a gap width between the movable electrode and the fixed electrode of 3 $\mu$m is manufactured using the above described silicon substrate having the groove structure 7, cut off frequency in frequency characteristics of the sensor is 900 Hz. In accordance with a conventional sensor which does not have any grooves on either of the fixed electrode and the movable the cut off frequency is 180 Hz. Furthermore, the sensor using the above described substrate having crossing grooves has a response speed five times faster than that of the conventional sensor. Further still the thickness of cantilever 8 is about 50 $\mu$m.

Among the groove structure 7 provided on surface of the movable electrode 4, when putting number of the grooves parallel to an axis of the cantilever 8 as the, number of the grooves crossing at right angles as n, and the width of each of the grooves as W, the more the number of grooves m and n increases, the faster movement of the gas between the facing gap between the electrodes and the grooves 7 is performed, and consequently, the faster the response speed of the accelerometer becomes.

Embodiments illustrated in FIGS. 3 and 4 are the sensors for providing the above described features. In accordance with the third embodiment illustrated in FIG. 3, the surface of the movable electrode 4 is divided into twelve areas in a grid pattern by the groove structure 7, and, in accordance with the fourth embodiment illustrated in FIG. 4, the movable electrode surface 4 is divided into 48 areas. An example of specifications of the above described movable electrodes 4 are the same as that of the second embodiment in dimensions for length and width of the electrodes. The width of the groove 7 in the third embodiment (FIG. 3) was 100 $\mu$m, and the areas divided by the groove structure 7 of various different sizes exist as a mixture (in this case, the ratio of the area occupied by the grooves 7 to the surface of the movable electrode 4 was 29%). The width of the groove comprising groove structure 7 in the fourth embodiment (FIG. 4) is 40 $\mu$m, and areas divided by the structure 7 of various different sizes exist as a mixture (in this case, the ratio of the area occupied by the grooves 7 to the surface of the movable electrode 4 was 28%). Sensors having a cut off frequency of more than 1 KHz are obtained by incrementing of the numbers of grooves in the third and the fourth embodiments, keeping the ratio of the groove structure 7 to the movable electrode 4 almost same as described above.

As for a capacitance type sensor, a more precise measurement is possible with a large capacitance. Accordingly, the area of the grooves, which does not contribute much to the capacitance, are preferably small. The above described results of from the second to the fourth embodiments reveal that the larger the numbers of the division, in other words, the larger the number of grooves, the faster the response speed is under a constant area of the groove structure 7.

According to the above described embodiments, the response speed to the acceleration can be made faster by forming a plurality of grooves crossing each other at right angles which is a simple geometric pattern on surface of the movable electrode 4.

EMBODIMENT 5-6

Figure 8:
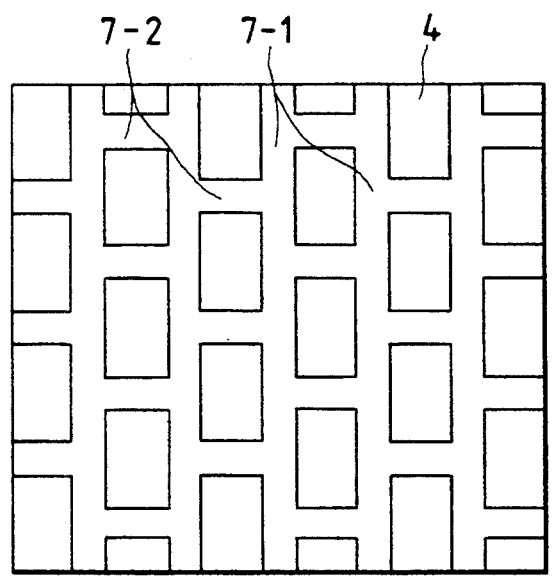
FIG. 8 is a plan view illustrating the movable electrode surface of the capacitance type accelerometer relating to the fifth embodiment of the present invention.

FIG. 8 is related to the fifth embodiment of the present invention, and illustrates only the surface of the movable electrode 4 of a capacitance type accelerometer. A plurality of grooves 7-1 parallel to an axis of a cantilever (illustration is omitted) and a plurality of grooves 7-2 connecting adjacent grooves among the above described grooves 7-1 are arranged on the surface of the movable electrode 4, with the closest among the grooves 7-1 and 7-2 to each of the sides of the movable electrode 4 being open to the sides, and the openings are so arranged as to open to an external space of the gap between the movable electrode and fixed electrodes.

Figure 9:
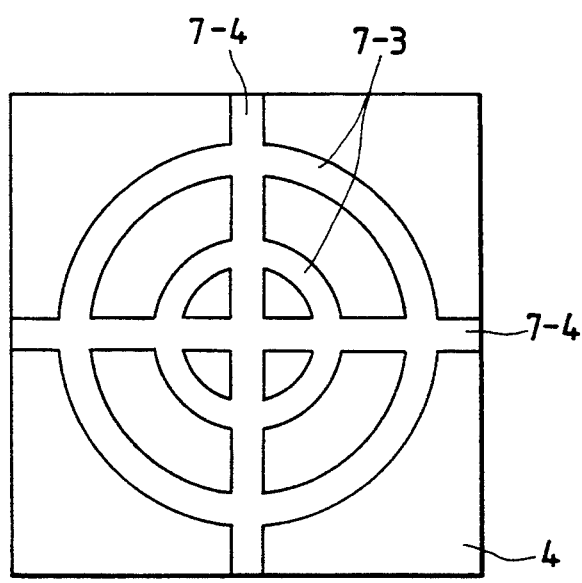
FIG. 9 is a plan view illustrating the movable electrode surface of the capacitance type accelerometer relating to the sixth embodiment of the present invention.

FIG. 9 illustrates only the surface of the movable electrode 4 relating to the sixth embodiment of the present invention. Two grooves 7-4 crossing each other at middle of the grooves and a plurality of grooves 7-3 forming a plurality of concentric circles, the center of which is the crossing point of the grooves 7-4, are arranged on the surface of the movable electrode 4. The concentric circles 7-3 are connected with the grooves 7-4 and, end portions of the grooves 7-4 are open to four sides of the movable electrode 4 so as to face on external side of the facing gap between the movable electrode and fixed electrodes.

With the geometrically arranged grooves in the above described two embodiments, any arbitrary point in the grooves is connected to the outside of the facing gap between the movable electrode and the fixed electrode through any of the grooves open to the outside. That means, because of smooth inter-connection between the grooves, gas flow in and out of the facing gap and the space outside the gap can be performed rapidly through the grooves.

Besides, in each of the above described embodiments, the grooves open to each side of the movable electrode are arranged at parallel or in right angles to axis of the cantilever. But the same air damping constant reducing effect can be realized by the grooves arranged at an angle relative to the axis of the cantilever.

EMBODIMENTS 7 AND 8

In accordance with a structure in which a movable electrode is supported by a cantilever from one side, the movable electrode is displaced using the base of the cantilever as a supporting point. Accordingly, the amount of displacement at the cantilever side of the movable electrode is smaller than that at top end side (opposite side end portion to the cantilever) of the movable electrode, and the amount of gas in the gap at the cantilever side which flows in and out from the gap to the space outside the facing gap when the movable electrode is displaced is smaller than that at the top end portion of the movable electrode. Therefore, the cantilever side portion of the movable electrode does not have much effect on the response speed of the sensor without the above described grooves for reducing the air damping constant.

Figure 10:
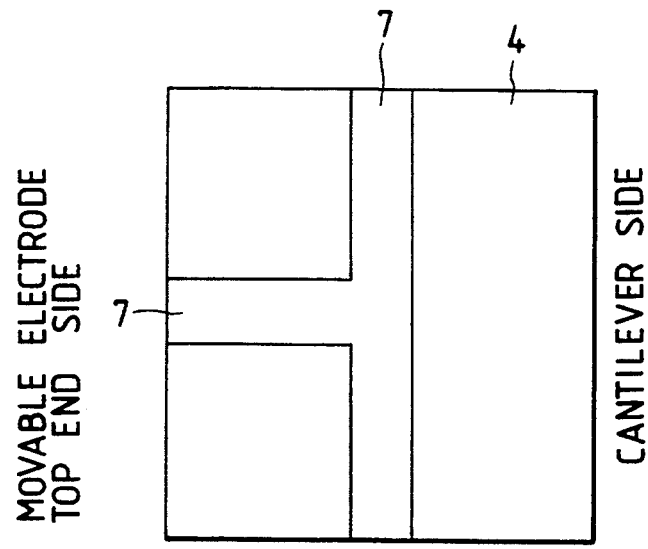
FIG. 10 is a plan view illustrating the movable electrode surface of the capacitance type accelerometer relating to the seventh embodiment of the present invention.
Figure 11:
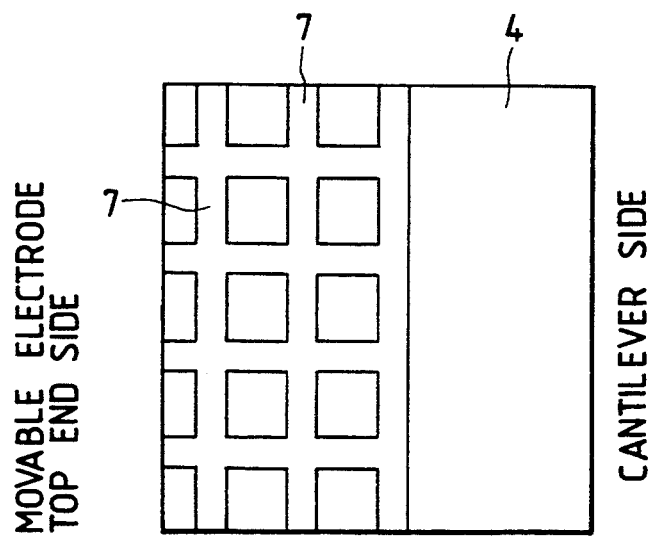
FIG. 11 is a plan view illustrating the movable electrode surface of the capacitance type accelerometer relating to the eighth embodiment of the present invention, FIGS. 12 (a) and (b) are respectively a vertical cross section and a plan view of movable electrode of the capacitance type accelerometer relating to the ninth embodiment of the present invention.

The embodiments illustrated in FIGS. 10 and 11 are examples of groove patterns of the movable electrodes 4 in consideration of the above described feature.

That is, in the seventh embodiment illustrated in FIG. 10, the groove structure 7 for reducing the air damping constant is not provided on almost half the area (less than a half) in the cantilever side of the surface of the movable electrode 4, but the grooves of the groove structure 7 are provided on the remnant half area (a region of top end side portion of the movable electrode). In the present embodiment, the grooves are arranged in T shape crossing, each end portion of the grooves opening into three sides of the movable electrode 4, and the openings facing the space outside the gap between the movable electrode and the fixed electrode.

In the eighth embodiment illustrated in FIG. 11, a plurality of grooves crossing each other at right angles are provided on almost half the area (more than a half) in the top end portion of the surface of the movable electrode 4 as in the seventh embodiment, and each end portion of the grooves of the groove structure 7 opens into three sides of the movable electrode 4.

In accordance with the embodiments 7 and 8, the following advantages are realized.

With a capacitance type sensor, as large a value as possible for the capacitance between the movable electrode and the fixed electrode is preferred, and accordingly, the area of the grooves which contribute little to the value of the capacitance is preferably decreased as much as possible. According to the present embodiment, the response speed of the sensor is increased with a minimal decrease in capacitance owing to formation of the grooves by setting a reasonable restriction on the area of the grooves 7 formed on the movable electrode 4.

EMBODIMENT 9

Figure 12A:
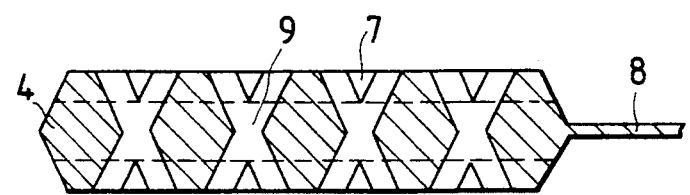
Figure 12B:
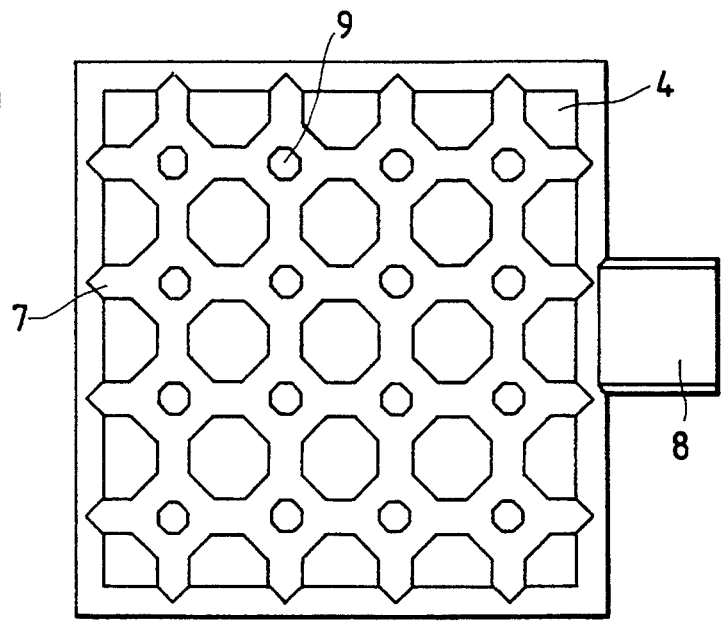

FIGS. 12 (a) and (b) are a vertical cross section and a plan view of a movable electrode of the capacitance type sensor relating to the ninth embodiment of the present invention.

In accordance with the present embodiment, a plurality of grooves comprising groove structure 7 crossing each other are formed on the movable electrode 4, end portions of each of the grooves comprising groove structure 7 are opened into sides of the movable electrode 4 as in the above described other embodiments. Further, through-holes 9 which pass through both sides of the movable electrode 4 are formed at the cross points of the grooves. The groove structure 7 and the through-holes 9 can be fabricated simultaneously by etching. Besides, each of same fixed electrodes as that of the embodiment 1 is arranged at facing small gaps on both sides of the movable electrode 4 (illustration in the FIG. is omitted).

In accordance with the ninth embodiment, when the movable electrode is displaced in response to an acceleration, gas is released from one of the two facing gaps provided at both sides of the movable electrode 4 and gas is absorbed into the other side gap. The crossing point of the grooves of groove structure 7 is a portion where the gases released from four gaps come together or the gases absorbed into four gaps come together, and, by forming the through-holes 9 which pass through both sides of the movable electrode 4 at the crossing points, such flow of the gas as "one side gap→the groove 7→the through-hole 9→the groove 7→other side gap" is faster than when the through holes 9 are formed at the other portions. As the result, according to the present embodiment, entering and releasing of the gas into and out of the gaps between the fixed electrode and the movable electrode are performed through the through-holes 9 in addition to the openings of the grooves 7 at the sides of the electrode, and, consequently, transfer of the gas in the gap becomes smoother.

In the above described present embodiment, the groove structure 7 for reducing the air damping constant is provided on the movable electrode surface, but the fixed electrode surface could be used instead, or both the movable electrode surface and the fixed electrode surface could be used for realizing the reduction of the air damping constant as in the other embodiments.

EMBODIMENT 10 AND 11

Figure 13:
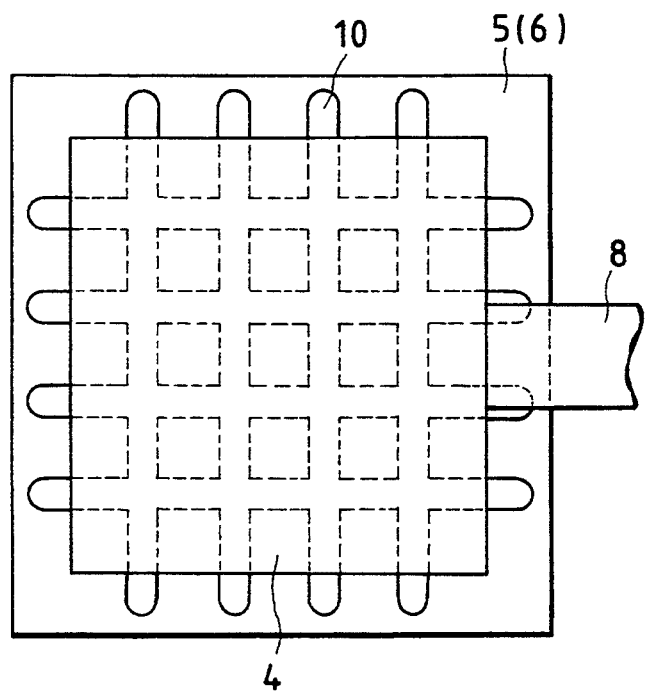
FIG. 13 is a drawing indicating the relation between the fixed electrode and the movable electrode of the capacitance type accelerometer relating to the tenth embodiment of the present invention.

FIG. 13 is a plan view of the fixed electrodes 5 and 6, whereon the grooves 10 for reducing the air damping constant are arranged in a grid pattern (embodiment 10), and each end portion of the groove structure 10 opens to outside of the facing portion between the fixed electrode 5 (6) and the movable electrode 4 so as to have a ventilating effect through the gap between the facing portion and the space outside the gap.

Figure 14:
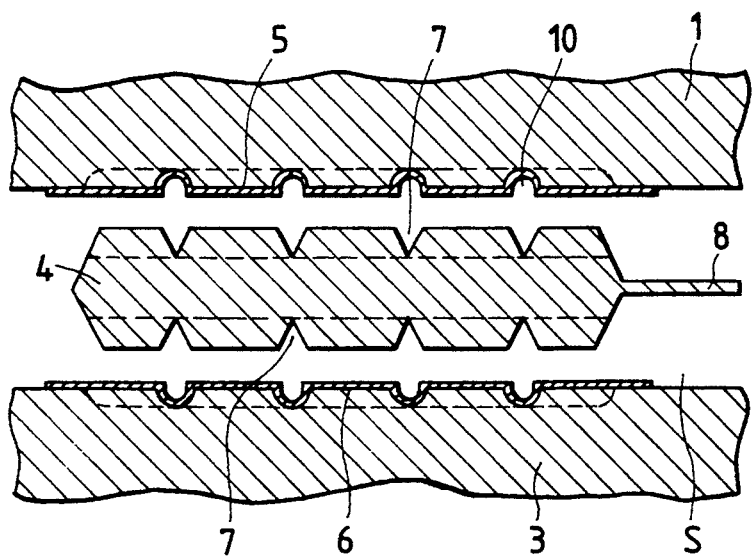
FIG. 14 is a vertical cross section illustrating a main portion of the capacitance type accelerometer relating to the eleventh embodiment of the present invention.

FIG. 14 is a partial cross section of a sensor (embodiment 11) having the grooves on both electrode surfaces of the movable electrode 4 and the fixed electrodes 5 and 6. In accordance with the above case wherein the groove structures 7 and 10 for reducing the air damping constant are provided on both electrodes, transferring speed of the gas inside and outside the electrodes is faster than when the groove structure 7 is provided on only one electrode, and an advantage of improving the response speed is realized. In this case, if the arrangement of the grooves on the movable electrode 4 coincides with that of the grooves on the fixed electrodes 5 and 6, the capacitance is decreased by forming the grooves just as when the grooves are formed on only one electrode.

In the eleventh embodiment, the groove structure 10 is formed on the surface of the fixed electrodes 5 and 6 by previous engraving of the grooves on each fixed electrode forming area of the insulating substrate 1 and 3 before forming the electrodes and subsequent forming of thin metallic film as the fixed electrodes. Each end portion of the groove structure 10 opens to the outside the portion adjacent to the fixed electrode 5 (6) and the movable electrode as well as the tenth embodiment.

Besides, although sensors wherein the movable electrode is supported by a cantilever are exemplified in the above described embodiments, the examples are not intended to restrict the present invention. Other structures include a movable electrode elastically supported in more than two directions, and a movable electrode supported by a film from a surrounding electrode rather than cantilever. The cantilever arrangement can be singular or plural.

Figure 15:
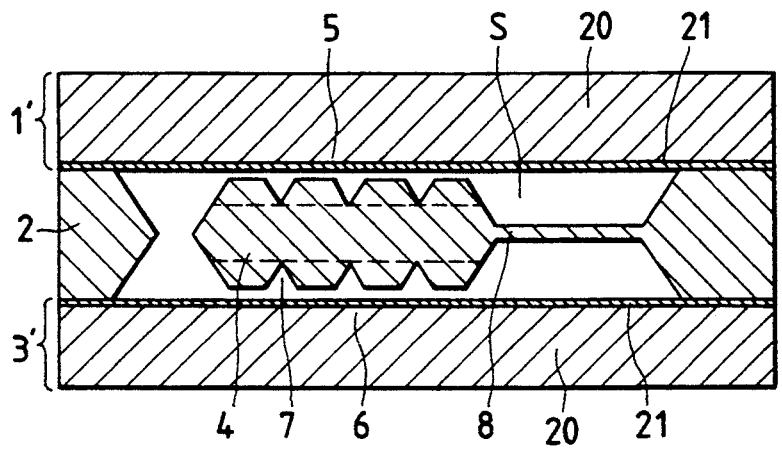
FIG. 15 is a vertical Cross section illustrating another example of the integrated layer structure of the base plate for the capacitance type accelerometer relating to the present invention.
Figure 16:
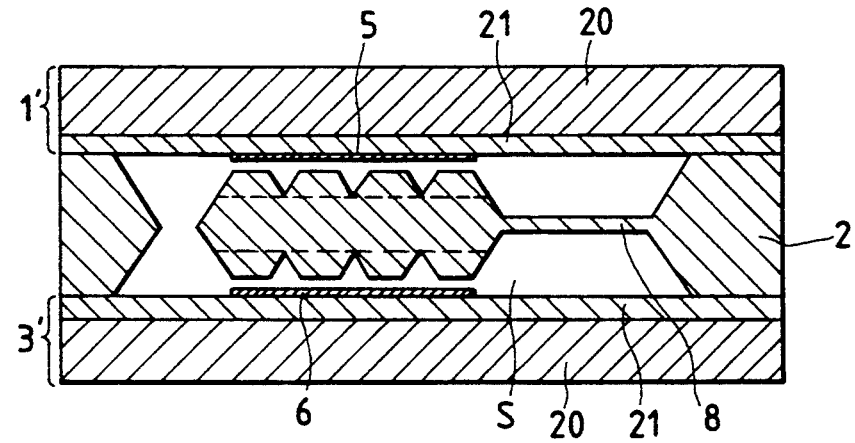
FIG. 16 is a vertical cross section illustrating another example of integrated layers structure of the base plate for the capacitance type accelerometer relating to the present invention.

The above described methods for improvement of response speed to acceleration are not restricted to only capacitance type accelerometer having such a structure as the insulating substrate 1-the silicon substrate 2-the insulating substrate 3 as shown in FIG. 1. That is, instead of the insulating substrate as shown in FIG. 15, the substrates 1' and 3' of the fixed electrodes 5 and 6 side comprise a substrate laminated with the silicon substrate 20 and the insulating substrate 21, for example, silicon oxide film (the insulating layer 21)/the silicon substrate 20 (in this case, the substrate 1' itself additionally serves as the fixed electrodes, 5 and 6). Further, the substrates 1' and 3' of the fixed electrodes 5 and 6 side can be composed of glass (the insulating layer 21)/the silicon substrate 20 as shown in FIG. 16. In the above described cases, the silicon oxide film/silicon substrate and the central silicon substrate 2 (the movable electrode 4 and the cantilever 8 are furnished) can directly be bonded at temperature higher than 1000° C. When the glass/silicon substrate shown in FIG. 16 is used, the glass/silicon substrate can be adhered with the central silicon substrate 2 by anodic bonding with glass.

The above described capacitance type accelerometers having grooves for reducing the air damping constant on surface of the electrodes are most suitable for usages requiring quick responses such as, for example, a sensor for collision detector in a air bag system of a car.

FIG. 17 is a composition diagram for explanation of an example of the air bag system which is one of application systems of the present invention. A means is provided wherein acceleration at of a car collision is detected as a change of capacitance between the movable electrode 4 of which surface is partitioned into a plurality of areas by the groove structure 7 for reducing the air damping constant and the fixed electrode 5 (or the fixed electrode 6) facing to the movable electrode 4 and an air bag is operated depending on the change of the capacitance.

That means, the car collision detector 30 having the fixed electrodes 5 and 6, and the movable electrode 4 with groove structure 7 for reducing the air damping constant, which is elastically supported in a position facing to the fixed electrodes with Gaps, is installed in a part of the car. In the installation of the detector 30, position of the movable electrode 4 can be changed back and forth in the car so as to detect a collision acceleration. The groove structure 7 comprised according to any of the states described in the above embodiments or in other states wherein important portions are similar with any of the above described embodiments.

A system is provided wherein change of the capacitance between the movable electrode 4 with Grooves and the other electrode 5 (or 6) are converted occurs in accordance to an acceleration signal by the acceleration detecting circuit 31 which is input to the microcomputer 33. The microcomputer 33 has a circuit for judging whether the acceleration signal is come from a collision or not, and the system has the air bag 34 which starts its operation in accordance with the collision judging signal from the microcomputer 34. The acceleration switch 35 controls connection of the circuits depending on value of the acceleration, and 32 is a power source. When a collision occurs, operation of the air bag 34 is started by and-sequence of the signal from the microcomputer 33 based on the acceleration detecting signal and a signal from the acceleration switch 35. The acceleration switch 35 increases reliability of the system operation. The accelerometer used in the above described air bag system was an open loop type.

The present invention is applied to technology relating to an accelerometer, but is applicable to other microsensors wherein a fixed portion and a movable portion, or a pair of movable portions, are provided, and width of the gap between a portion facing the fixed portion and the movable portion or the movable portions varies depending on the movement of the movable portion such as, for example, a capacitance type pressure sensor. Further, the present invention is applicable to microactuators, for example, increasing the response speed of a microvalve in closing and opening operations. In the above case, grooves or grooves and through-holes connecting to outside portion are formed in a part of the facing portion.

In accordance with the present invention, response speed of accelerometers can be improved by providing grooves for reducing air damping constant at least one of fixed electrodes and movable electrodes, and, especially, the present invention is preferably applicable to such accelerometers (collision sensors) requiring quick response as that for an air bag system.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A capacitance-accelerometer, comprising:
   a fixed electrode; and
   a movable electrode being supported by a cantilever at a portion adjacent to said fixed electrode having a gap thereinbetween;
   wherein grooves for reducing air damping are provided on a surface of said movable electrode, and
   said grooves are so arranged that electrode surface areas divided by said grooves are symmetrical with respect to a symmetrical axis parallel to said cantilever.

2. A capacitance type accelerometer as claimed in claim 1, wherein
   said fixed electrode is arranged so as to respectively face both surfaces of said movable electrode, and
   said grooves are formed on both surfaces of said movable electrode.

3. A capacitance-accelerometer, comprising:
   a fixed electrode; and a movable electrode being supported by a cantilever at a portion adjacent to said fixed electrode having a gap thereinbetween;

wherein grooves having openings which are disposed of at at least one side of said electrodes and are inter-connected with each other, are provided on a surface of said movable electrode, and said grooves are so arranged that electrode surface areas divided by said grooves are symmetrical with respect to a symmetrical axis parallel to said cantilever.

4. A capacitance type accelerometer as claimed in claim 3, wherein said fixed electrode is arranged so as to respectively face both surfaces of said movable electrode, and said grooves are formed on both surfaces of said movable electrode.

5. A capacitance type accelerometer as claimed in either of claims 2 and 4, wherein said grooves are symmetrically formed on both surfaces of said movable electrode.

6. A capacitance-accelerometer comprising:

a fixed electrode; and a movable electrode being supported by an elastic body and facing said fixed electrode at a portion having a gap thereinbetween;

wherein grooves are provided on a surface of said movable electrode to divide said surface into a plurality of electrode surface areas, said grooves are so arranged that said plurality of electrode surface areas divided by said grooves are uniformly balanced, and end portions of said grooves open to four sides of said movable electrode.

7. A capacitance-accelerometer, comprising:

a movable electrode being supported by an elastic body; and fixed electrodes, said movable electrode being disposed thereinbetween said fixed electrodes and said fixed electrodes facing respective surfaces of said movable electrode at a portion having a gap thereinbetween;

wherein a plurality of grooves crossing each other on the surface of said movable electrode, end portions of said grooves open to an outside portion at the portion between said fixed electrodes and said movable electrode through openings, and through-holes leading to both surfaces of said movable electrode are formed at crossing points of said grooves.

8. A capacitance type accelerometer as claimed in any of claims 1, 3, 5, 6, 7, 2 and 4, wherein the movable electrode, either of the cantilever or the elastic body for supporting said movable electrode, and grooves or grooves and through-holes on the movable electrode are formed by anisotropic etching of a silicon substrate.

9. A capacitance type accelerometer as claimed in any of claims 1, 3, 5, 6, 7, 2 and 4, wherein said fixed electrodes are formed on a glass substrate, furthermore, the movable electrode, either of the cantilever or the elastic body for supporting said movable electrode, and grooves or grooves and through-holes on said movable electrode are formed by anisotropic etching of a silicon substrate, and said substrates are adhered by anodic bonding.

10. A capacitance type accelerometer as claimed in any of claims 1, 3, 5, 6, 7, 2 and 4, wherein said fixed electrodes are formed on glass of a silicon/glass laminated substrate, furthermore, the movable electrode, either of the cantilever or the elastic body for supporting said movable electrode, and grooves or grooves and through-holes on said movable electrode are formed by anisotropic etching of a silicon substrate, and said substrates are adhered by anodic bonding.

11. A capacitance type accelerometer as claimed in any of claims 1, 3, 5, 6, 7, 2 and 4, wherein said fixed electrodes are formed on glass of a silicon/glass laminated substrate, furthermore, the movable electrode, either of the cantilever or the elastic body for supporting said movable electrode, and grooves or grooves and through-holes on said movable electrode are formed by anisotropic etching of a silicon substrate, and said substrates are adhered by silicon oxide therebetween.

* * * * *